United States Patent [19]

Sabol et al.

[11] Patent Number: 5,512,222
[45] Date of Patent: Apr. 30, 1996

[54] METHOD OF USING A CHILLED TROUGH FOR PRODUCING SLABS OF POLYURETHANE FOAM

[75] Inventors: Edward Sabol, Chestnut Hill, Pa.; Thomas Cushman, Ossian, Ind.

[73] Assignee: Foamex L.P., Linwood, Pa.

[21] Appl. No.: 404,413

[22] Filed: Mar. 15, 1995

[51] Int. Cl.[6] ................................................. B29C 44/20
[52] U.S. Cl. ........................ 264/51; 264/45.8; 264/53; 264/DIG. 84
[58] Field of Search ........................ 264/DIG. 84, 45.8, 264/51, 53, 50

[56] References Cited

U.S. PATENT DOCUMENTS

| | | |
|---|---|---|
| 3,786,122 | 1/1974 | Berg . |
| 3,832,099 | 8/1974 | Berg . |
| 3,870,441 | 3/1975 | Petzetakis ................ 264/DIG. 84 |
| 4,032,275 | 6/1977 | Schwab et al. ................ 425/89 |
| 4,074,960 | 2/1978 | Dockray et al. . |
| 4,093,109 | 6/1978 | Schrader ................ 264/DIG. 84 |
| 4,158,032 | 6/1979 | Boon ................ 264/51 |
| 4,246,356 | 1/1981 | Walmsley ................ 264/DIG. 84 |
| 4,298,557 | 11/1981 | Bradford et al. ................ 425/89 |
| 4,363,610 | 12/1982 | Murray et al. ................ 264/DIG. 84 |
| 4,530,807 | 7/1985 | Vreenegoor ................ 264/51 |
| 5,409,649 | 4/1995 | Pool ................ 264/51 |

FOREIGN PATENT DOCUMENTS 0000058  12/1978  European Pat. Off. ........ 264/DIG. 84

*Primary Examiner*—Allan R. Kuhns
*Attorney, Agent, or Firm*—Connolly and Hutz

[57] ABSTRACT

An apparatus and method for producing a continuous slab of polymeric foam uses an open topped trough with an upper pour plate adjacent to a moving conveyor. A liquid reactant foam mixture is continually introduced into the bottom of the trough and allowed to rise and partially expand until the mixture flows over the pour plate and onto a moving conveyor to complete its expansion and cure as it is conveyed. The inner surfaces of the trough are chilled to reduce the reaction rate of the liquid foam mixture and thereby prevent the undesired build-up of cured foam on the surfaces of the trough. The chilled trough may be formed from a plurality of hollowed panels fitted with interior baffles to define inner fluid passageways. A chilled fluid, such as water, is pumped through the passageways. Longer production runs with fewer defects are advantages of this apparatus and method.

6 Claims, 5 Drawing Sheets

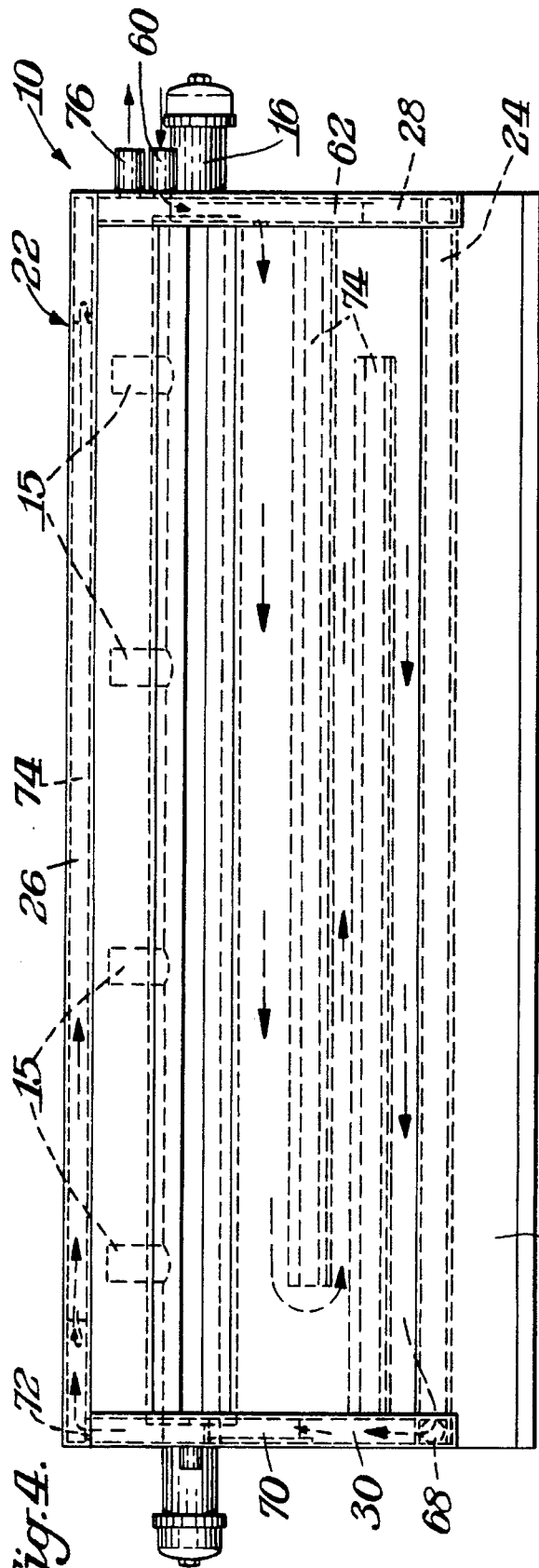
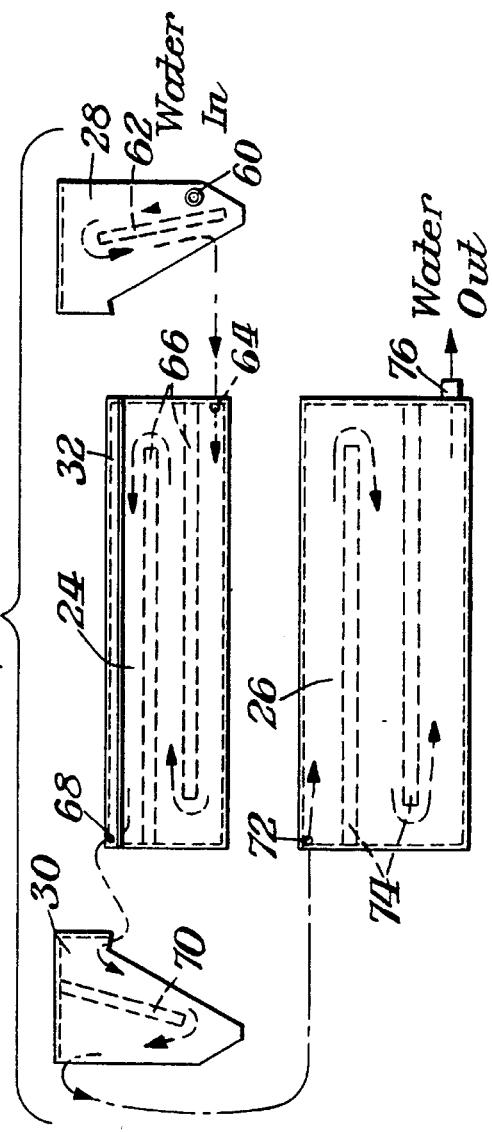

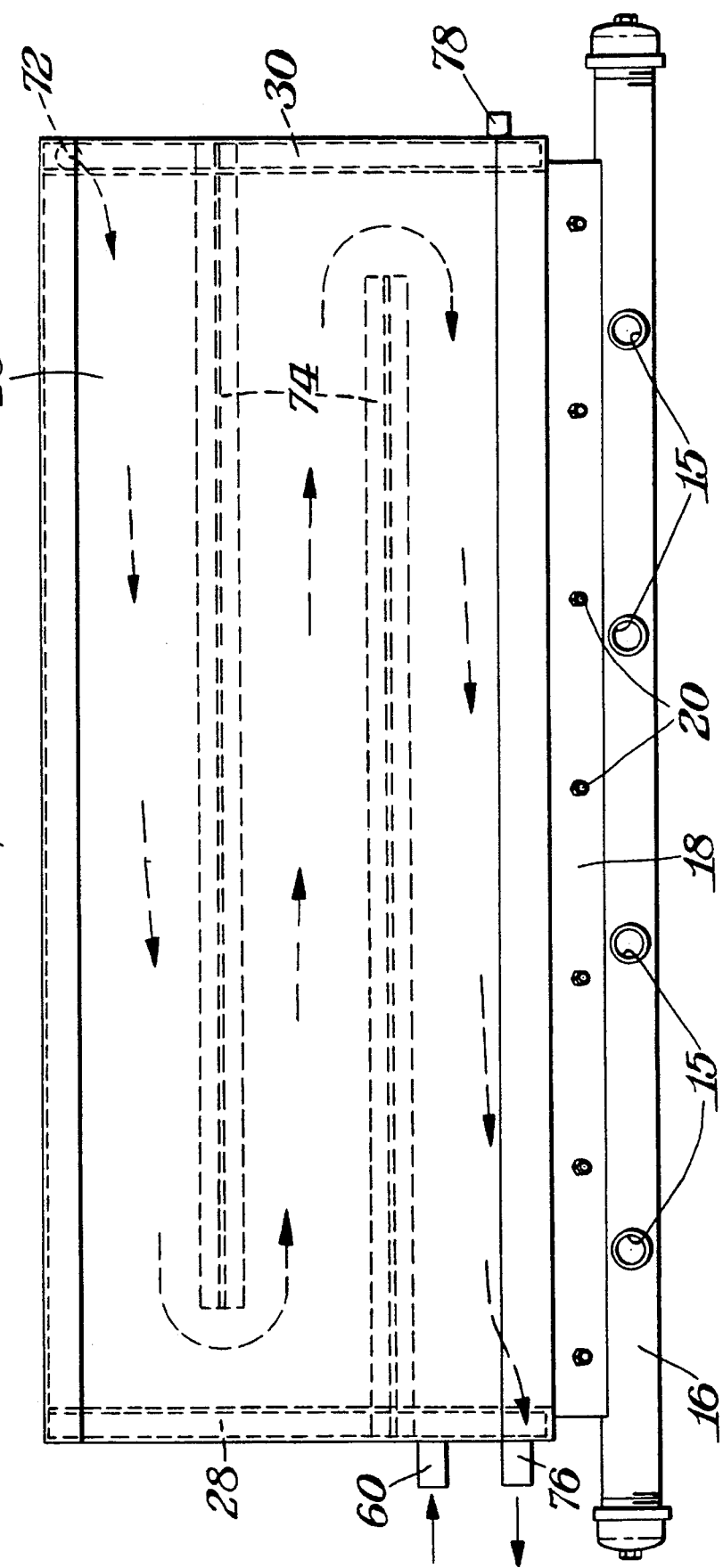

ns the fou

METHOD OF USING A CHILLED TROUGH FOR PRODUCING SLABS OF POLYURETHANE FOAM

BACKGROUND OF THE INVENTION

Slabs of polyurethane foam may be formed in a method that includes the steps of introducing the liquid foam-forming mixture into the bottom portion of an open trough, and allowing the foam mixture to expand in the trough until it spills over a weir or pour plate at the top of the trough onto a moving channel-shaped conveyor. As the foam-forming mixture fills the trough, it begins to change from a liquid to a froth. This froth, the partially expanded foam, then spills over the weir and onto the paper or plastic-lined conveyor that moves away from the trough at a steady rate. The foam completes the transition from liquid to solid foam as it travels along the conveyor. The cured foam slab may then be cut to any desired shape. Such prior apparatus for manufacturing foam slabs are disclosed in U.S. Pat. Nos. 4,074,960, 3,832,099 and 3,786,122.

Various configurations for the trough have been proposed, including means to adjust to length of the trough, means to vary the number of inlet ports at the bottom of the trough, and the choice of materials used to make the trough. The interior surfaces of all of these prior trough configurations will in time become coated with reacting foam as a production run progresses. As the inner surfaces of the trough get coated with more and more of the foam, the volume of the trough in which the expanding foam mixture can rise is correspondingly reduced. Under such conditions, the foaming mass that exits the top of the trough is less viscous than anticipated, and tends to run too quickly down the inclined pour plate onto the conveyor. The resultant foam block may have serious defects when this occurs. In addition pieces of the built-up cured foam can break off the inside surfaces of the trough and become imbedded in the still-reacting foam mixture. These pieces cause additional serious defects in the resultant foam block. Ultimately, the trough surfaces become so built-up with cured foam that production must be halted to remove this build up.

SUMMARY OF THE INVENTION

A method for producing a continuous slab of expanded polymeric foam, such as polyurethane foam, from a mixture of liquid foam reactants involves the steps of continuously introducing the mixture of liquid foam reactants into the bottom interior portion of a trough with an open top. The trough is formed of panels that define inner surfaces. The liquid foam mixture expands upwardly in the trough due to the chemical reaction between the reactants in the mixture. The foam expansion at the inner surfaces of the trough is controlled by chilling the inner surfaces of the trough, preferably to a temperature in the range of about −10° to about 10° C., most preferably about 5° to about 10° C. While in a partially expanded state, the foam mixture or froth flows from the top of the trough, over a pour plate and onto a continuously moving, open-topped, channel-shaped conveyor. The foam mixture completes its vertical expansion and cure as it is conveyed away from the trough, preferably at the rate of about 3 meters per minute.

An apparatus for producing a continuous slab of expanded polymeric foam from a mixture of liquid foam reactants has a chilled trough adjacent to a continuously moving open-topped channel-shaped conveyor. The inner surfaces of the trough are chilled to a temperature in the range of about −10° to about 10° C. Preferably, the open-topped chilled trough is formed from a plurality of hollowed and baffled panels connected together. A foam distribution manifold is connected to the bottom of the trough. A pour plate over which partly expanded foam may flow is on the top of the trough.

A chilled fluid is pumped through passageways within the hollowed interior of the panels the passageways may be further defined by inner baffles placed within the panels. Preferably passageways are formed within each of the front, rear, right side and left side panels of the trough. Most preferably, the passageways communicate to form a single contiguous path for the flow of a pumped chilled fluid into a first panel and through each panel in succession until draining from the last panel. Chilled water may be used as the chilled fluid.

BRIEF DESCRIPTION OF THE DRAWINGS

A preferred embodiment of the invention will now be described, by way of example only, with reference to the accompanying drawings, in which:

FIG. 4 is a top plan view of the trough and manifold of FIGS. 2 and 3;

FIG. 6 is a rear elevational view of the trough and manifold of FIGS. 2–5; and

FIG. 7 is a schematic view of the panels that form the trough of FIGS. 2–6 to show the contiguous fluid flow pattern through the panels of the trough.

DESCRIPTION OF THE PREFERRED EMBODIMENT

Figure 1:
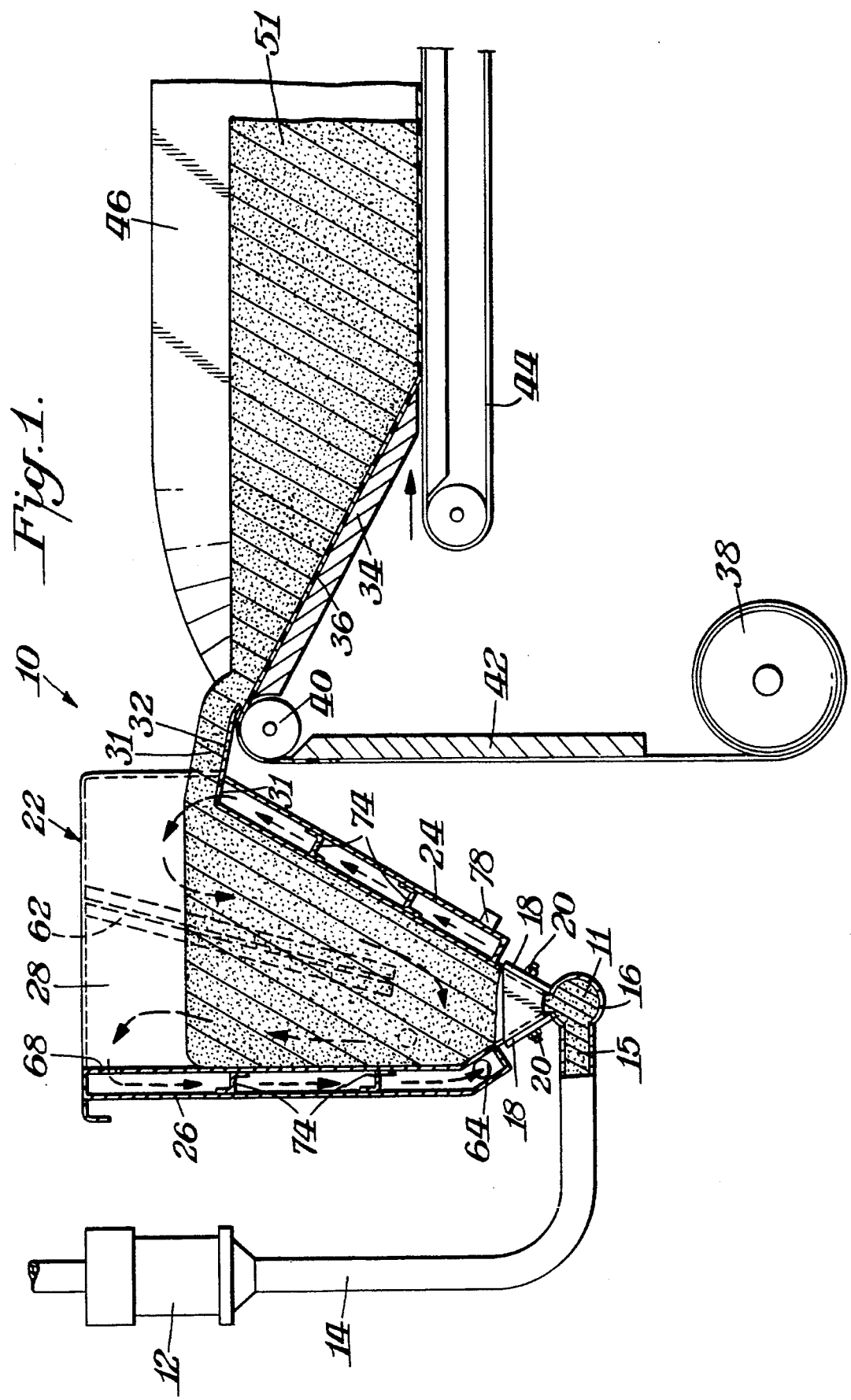
FIG. 1 is a schematic left side elevational view in partial cross-section showing an apparatus for the production of polymeric foam slabs according to the invention.

Referring first to FIG. 1, an apparatus 10 for the production of polyurethane foam slabs comprises a mixing head 12 into which the liquid reactants for forming a foam (well known to those of skill in the art) are introduced. The mixing head 12 communicates with the foam feed conduits 15 of a distribution manifold 16 via piping 14. The manifold 16 is attached to the bottom portion of a trough 22 by manifold connector plates 18 and fasteners 20.

A front baffled panel 24, rear baffled panel 26 and right and left side baffled panels 28, 30 fit together to form the trough 22. An inclined pour plate 32 is on or attached to the top of the front baffled panel 24. The pour plate 32 and trough 22 are positioned adjacent to an inclined fall plate 34, which in turn is positioned adjacent a belt conveyor 44.

The inclined fall plate 34 and the top surface of the belt conveyor 44 are lined with a flat bottom sheet 36 of Kraft paper or plastic from a supply roll 38. The sheet 36 is loaded onto the inclined fall plate and belt conveyor by taking the sheet from the supply roll 38 and running it adjacent to an upright support member 42 and around a roller 40. This roller 40 preferably is positioned just below the pour plate 32. Upstanding paper or plastic side sheets 46 are positioned adjacent to each side of the inclined fall plate 34 and conveyor 44. The flat bottom sheet 36 and upstanding side sheets 46 line and protect the conveyor belt 44 and the surfaces of the conveyor walls (not shown). The sheets 36 and 46 prevent the foam forming mixture and foam from building up on the moving conveyor belt 44 and stationary side walls of the conveyor. The sheets 36 and 46 are peeled or torn away from the surface of the finished cured foam slab before the slab is further cut or shaped according to customer requirements.

To produce slabstock polyurethane foams using the apparatus shown in FIG. 1, first a liquid foam mixture 11 is introduced into the mixing head 12. That mixture 11 travels through piping 14 to the foam feed conduits 15 and into the foam distribution manifold 16. The mixture 11 enters the bottom portion of the trough 22 through an opening in the manifold 16 and begins to froth or expand. As additional liquid foam reactant mixture is continuously introduced into the bottom of the trough 22, the frothing and expanding foam mixture will rise to the open top of the trough 22. Eventually, the expanding foam mixture 31 will spill over the pour plate 32 and onto the sheet-lined inclined fall plate 34. The bottom and side sheets 36, 46 are continually and steadily moving away from the pour plate 32, carrying the foaming and expanded foam away from the trough at a rate of about 3 to about 5 meters per minute. The foam completes expanding as it is conveyed, forming the finished foam 51 a substantial distance from the trough 22. The conveyor will usually have a length of about 25 to 40 meters.

Heretofore, the expansion of the liquid foam mixture in the troughs of prior apparatus could not be readily controlled to prevent the build up of cured foam on the inner surfaces of the troughs. The present invention, as shown in FIGS. 1–7, incorporates means to chill the inner walls of the trough to better control the rate of expansion of the liquid foam reactants within the trough and overcome the problem with the prior foam-forming apparatus.

Figure 2:
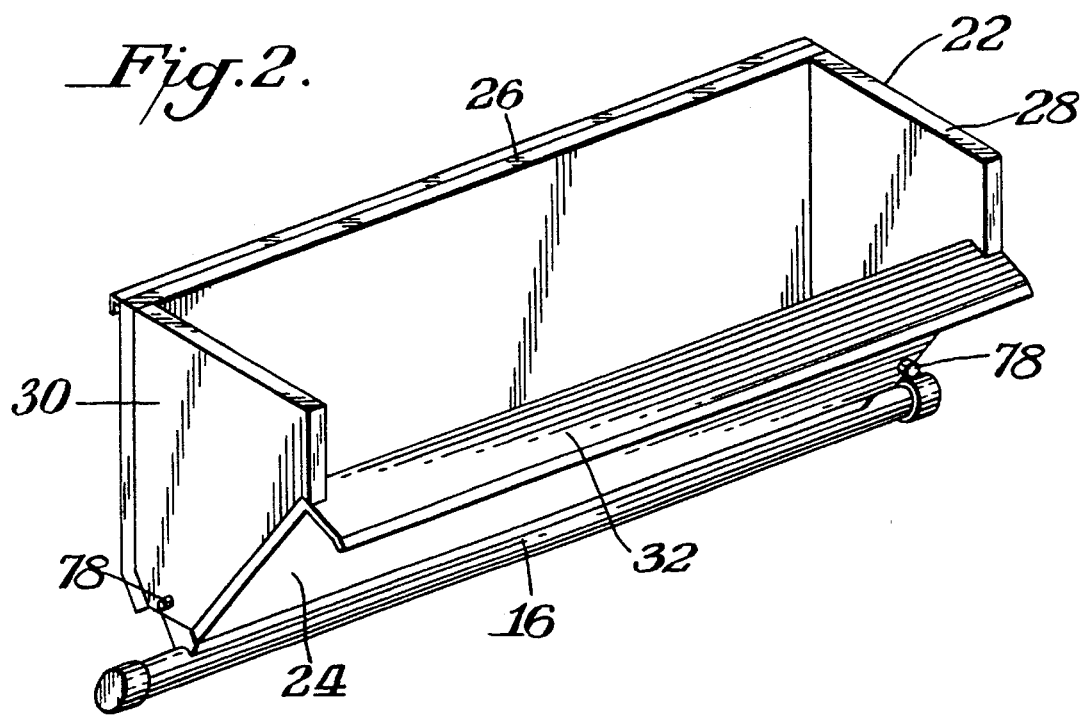
FIG. 2 is a prospective view of a trough and liquid foam reactant distribution manifold according to the invention.

As shown in FIG. 2, the trough 22 is formed by connecting together a front panel 24, rear panel 26 and left and right side panels 28, 30. A liquid foam distributing manifold 16 is attached to the bottom of the trough 22. The panels that form the trough 22 have substantially hollow interiors and inner baffles are mounted within the interiors to form channels through which fluid may flow. The panels may be formed from any material that will hold a fluid and will not substantially react with the foam-forming reactant mixture, such as steel or aluminum. Most preferably, the interior surfaces of the panels, and the baffles within the panels, are coated with a protective resin or plastic, such as teflon, to reduce corrosion. In addition the inner walls of the trough 22 should be quite smooth to minimize the areas at which a foam build-up might start.

Figure 3:
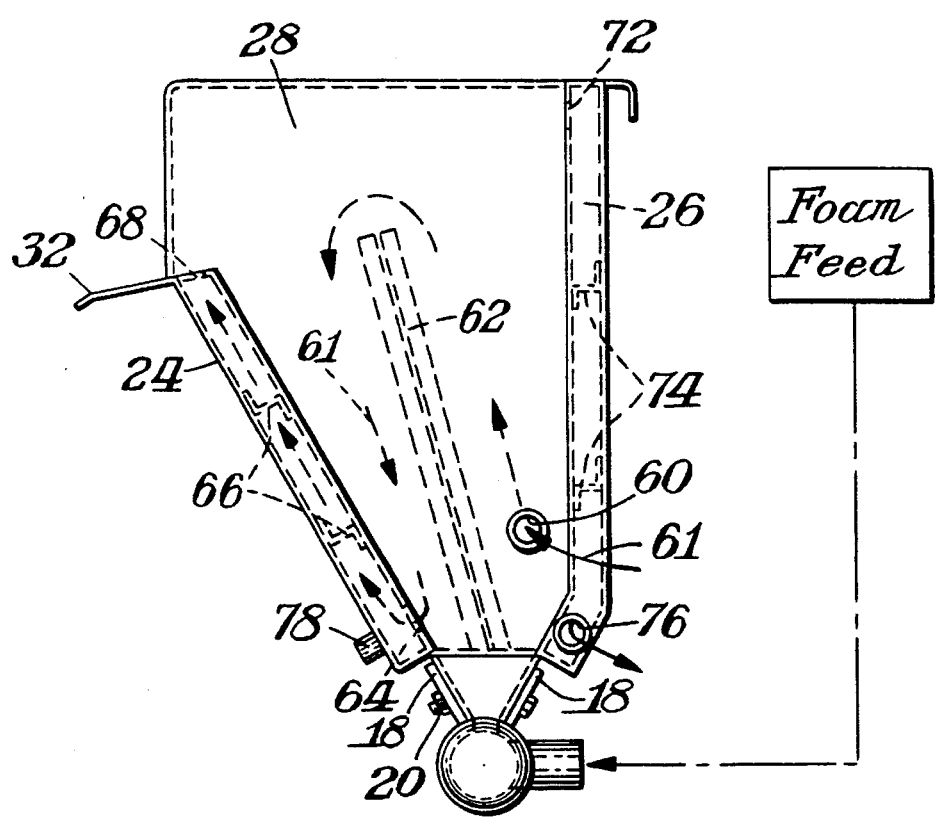
FIG. 3 is a side elevational view of the right side of the trough and manifold of FIG. 2.

Referring now to FIG. 3, the right side baffled panel 28 has at its lower portion a fluid inlet 60 into which a fluid may be pumped (pump not shown). The fluid flows in the direction of the arrows 61 in FIG. 3 through the passageway formed in the interior of the panel 28 and around the angled baffle 62 within the right panel 28. The pumped fluid exits the right panel 28 and enters the front baffled panel 24 through connecting port 64 located in a lower portion of the wall of the right panel 28 and a lower portion of the wall of the front panel 24.

Figure 5:
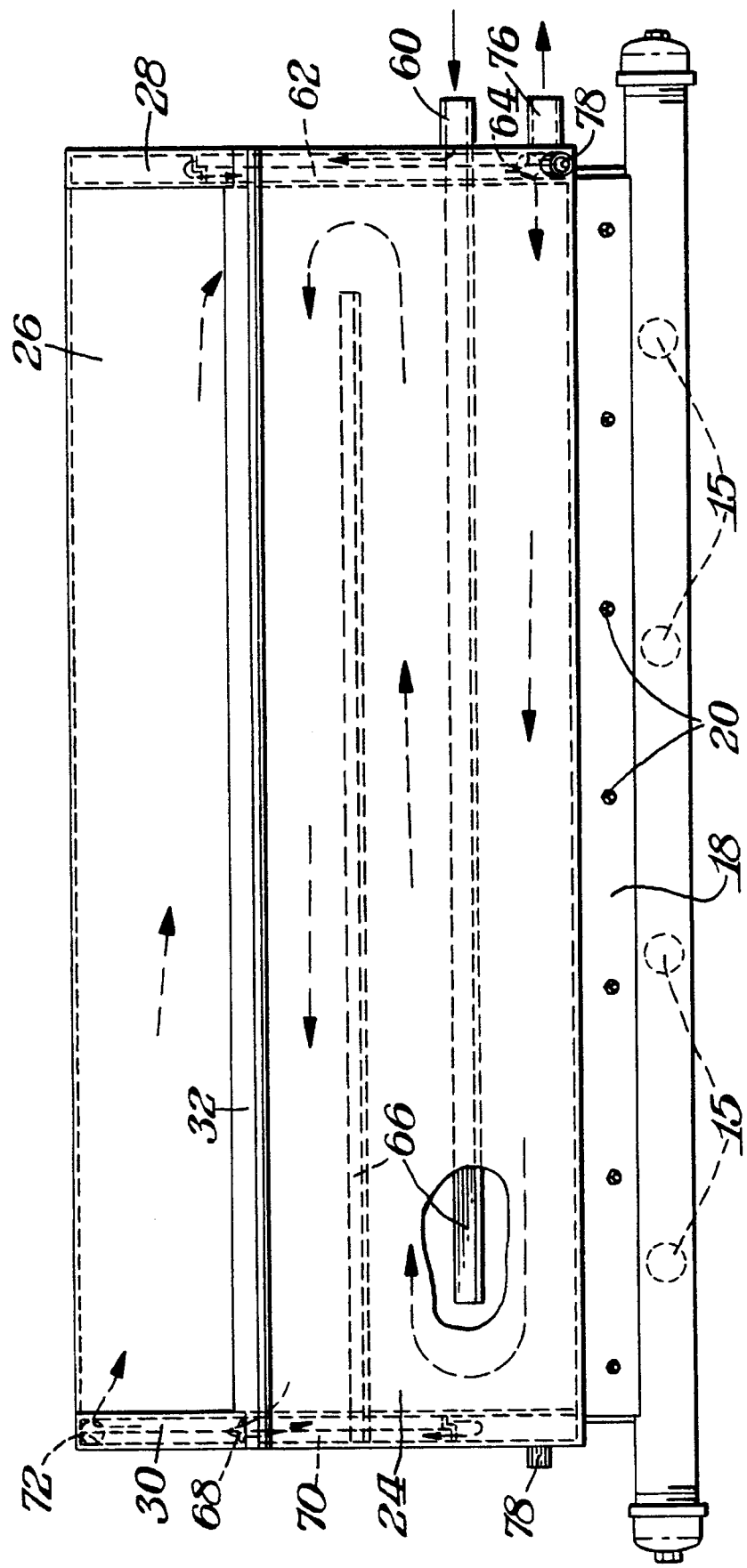
FIG. 5 is a front elevational view of the trough and manifold of FIGS. 2–4.

Referring next to FIGS. 3, 5, and 7, the pumped fluid then flows in the direction of the arrows 65 (FIG. 5) through the passageway defined in the interior of the front baffled panel 24 and around the horizontal baffles 66. The fluid exits the front panel 24 and enters the left side panel 30 through connecting port 68 located in an upper portion of the wall of the front panel 24 and an upper portion of the wall of the left side panel 30.

As shown now in FIGS. 4, 5 and 7, the pumped fluid next flows through the passageway defined in the interior of the left baffled panel 30 and around the angled baffle 70. The fluid exits the left panel 30 through connecting port 72 located in an upper portion of the wall of the left baffled panel 30 and in an upper portion of the wall of the rear baffled panel 26.

Finally, as shown in FIGS. 6 and 7, the pumped fluid flows in the direction of the arrows 73 (FIG. 6) through the passageway defined in the interior of the rear baffled panel 26 and around the horizontal baffles 74. The fluid exits the rear panel 26 through the outlet drain 76 to a cooling reservoir (not shown). Thus, the passageways within the front, rear, left and right side panels are connected in fluid communication to form a contiguous fluid path around all the front, rear, left and right of the trough 22.

Additional drains 78 (FIG. 2) may be provided in any of the hollow panels that form the trough 22 to allow excess fluid to be drained out of such panels.

As is readily apparent, the chilled fluid may be pumped through the passageways in the panels in the opposite direction. Moreover, the passageways need not be provided within all of the panels and need not be interconnected to form a contiguous fluid path as shown in this preferred embodiment. Those of skill in the art might also practice our inventive method by placing a cooling jacket around the outside of the troughs used in prior apparatus for continuously producing slabstock polymeric foams.

If the inner surfaces of the trough were not cooled, the temperature of the reacting foam mixture at the inner surfaces of the trough would reach about 25° to about 50° C. To maintain the inner surfaces of the trough 22 at a cool temperature and thereby better control the rate at which the liquid foam mixture expands within the trough, a chilled fluid is pumped into the inner passageways defined by the baffled panels. Preferably, the chilled fluid is a liquid maintained at a temperature in the range of about −10° to about 10° C., most preferably 0° to 10° C., and is pumped at a rate sufficient to maintain a substantially constant inner trough wall surface temperature in the range of about −10° to about 10° C., most preferably about 5° to about 10° C. This lower surface temperature keeps the liquid foam reactant mixture immediately in contact with the inner surfaces of the trough walls from reacting at a normal rate. By retarding this reaction rate, the inner surfaces of the trough 22 remain clear and free of harmful foam build up that would otherwise create foam slab defects and shorten production runs.

When using water as the chilled pumped fluid, the water should be chilled to a temperature of about −10° to about 10° C. and pumped through the passageways in the trough panels at a rate of about 10 to about 15 liters per minute.

We claim:

1. A method for producing a continuous slab of expanded polymeric foam from a mixture of liquid foam reactants, comprising the steps of:

(a) continuously introducing the mixture of liquid foam reactants into a bottom portion of a trough having inner surfaces and an open top;

(b) permitting the mixture to expand upwardly in the trough due to the chemical reaction between said reactants;

(c) cooling the inner surfaces of the trough as the mixture expands upwardly in the trough;

(d) causing the mixture, while in a partially expanded state, to flow from the top of the trough and over a pour plate; and (e) continuously moving the partially expanded foam mixture way from the pour plate on a continuously travelling open-topped channel-shaped conveyor within which the foam mixture completes its vertical expansion.

2. The method of claim 1, wherein the inner surfaces of the trough are cooled to a temperature in the range of about −10° to about 10° C.

3. The method of claim 1, wherein the trough is formed from a plurality of panels with interior passageways and a chilled fluid is pumped through the passageways in the panels to cool the inner surfaces of the trough.

4. The method of claim 3, wherein the chilled fluid pumped through the passageways of the panels of the trough is water.

5. The method of claim 3, wherein the chilled fluid pumped through the passageways of the panels of the trough is maintained at a temperature in the range of about −10° to about 10° C.

6. The method of claim 3, wherein the chilled fluid is pumped through the passageways in the panels of the trough at a flow rate in the range of about 10 to about 15 liters per minute.

\* \* \* \* \*

UNITED STATES PATENT AND TRADEMARK OFFICE
CERTIFICATE OF CORRECTION

PATENT NO. : 5,512,222
DATED : April 30, 1996
INVENTOR(S) : Sabol, et. al.

It is certified that error appears in the above-indentified patent and that said Letters Patent is hereby corrected as shown below:

In col. 2, line 7, delete "panels the" and insert: --panels. The--.

In col. 2, line 25, delete "prospective" and insert:--perspective--.

In col. 3, line 5, delete "tom" and insert: --torn--.

In col. 3, line 11, delete "conduits" and insert:--conduit--.

In claim 1, col. 5, line 2, delete "way" and insert:--away--.

Signed and Sealed this

Twenty-fourth Day of September, 1996

Attest:

BRUCE LEHMAN

Attesting Officer

Commissioner of Patents and Trademarks